US011332568B2

(12) United States Patent
Seo et al.

(10) Patent No.: US 11,332,568 B2
(45) Date of Patent: May 17, 2022

(54) METHOD FOR PREPARING GRAFT COPOLYMER AND GRAFT COPOLYMER PREPARED THEREBY

(71) Applicant: LG CHEM, LTD., Seoul (KR)

(72) Inventors: Jae Bum Seo, Daejeon (KR); Dae Woo Lee, Daejeon (KR); Jung Tae Park, Daejeon (KR); Gyu Sun Kim, Daejeon (KR); Ji Uk Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 236 days.

(21) Appl. No.: 16/621,681

(22) PCT Filed: Oct. 26, 2018

(86) PCT No.: PCT/KR2018/012847
§ 371 (c)(1),
(2) Date: Dec. 11, 2019

(87) PCT Pub. No.: WO2019/088598
PCT Pub. Date: May 9, 2019

(65) Prior Publication Data
US 2020/0199280 A1    Jun. 25, 2020

(30) Foreign Application Priority Data

Nov. 1, 2017  (KR) .................. 10-2017-0144958

(51) Int. Cl.
*C08F 279/04* (2006.01)
*C08F 2/02* (2006.01)
*C08F 2/04* (2006.01)
*C08F 255/06* (2006.01)

(52) U.S. Cl.
CPC .............. *C08F 279/04* (2013.01); *C08F 2/02* (2013.01); *C08F 2/04* (2013.01); *C08F 255/06* (2013.01)

(58) Field of Classification Search
CPC ..... C08F 255/06; C08F 212/08; C08F 220/44
See application file for complete search history.

(56) References Cited

U.S. PATENT DOCUMENTS

| 4,006,201 A * | 2/1977 | Bauer ................. C08F 255/026 525/255 |
| 4,925,896 A | 5/1990 | Matarrese et al. |
| 5,204,405 A * | 4/1993 | Orikasa ................... C08L 23/02 525/189 |
| 6,333,381 B1 * | 12/2001 | Asada ................... C08F 279/02 525/71 |
| 6,376,605 B1 | 4/2002 | Sugimoto et al. |
| 2010/0210778 A1 | 8/2010 | Lakeman et al. |
| 2010/0331475 A1 * | 12/2010 | Hong ................... C08F 279/02 524/504 |
| 2012/0034467 A1 * | 2/2012 | Nagasaka ............... C08L 25/16 428/412 |
| 2016/0102200 A1 * | 4/2016 | Mochizuki .............. C08L 67/02 524/504 |

FOREIGN PATENT DOCUMENTS

| CN | 1229815 A | 9/1999 |
| CN | 101311198 A | 11/2008 |
| EP | 0054148 A2 | 6/1982 |
| JP | S63278914 A | 11/1988 |
| JP | H01242610 A | 9/1989 |
| JP | H0312444 A | 1/1991 |
| JP | H09132619 A | 5/1997 |
| JP | H11130825 A | 5/1999 |
| JP | 2000186125 A | 7/2000 |
| KR | 20050051940 | 6/2005 |
| KR | 20050051940 A * | 6/2005 |
| KR | 20060086194 | 7/2006 |
| KR | 20060122263 | 11/2006 |
| KR | 20070024770 | 3/2007 |
| KR | 20070024770 A * | 3/2007 |
| KR | 20070043480 | 4/2007 |
| KR | 100896210 | 5/2009 |
| KR | 20090072946 | 7/2009 |
| KR | 20100060013 | 6/2010 |
| KR | 20100062417 | 6/2010 |
| KR | 20140041666 | 4/2014 |
| WO | WO2017104715 A1 | 6/2017 |

OTHER PUBLICATIONS

Search Report dated May 20, 2020 for European Application No. 18873748.0.
International Search Report issued in related PCT/KR2018/012847 dated Apr. 11, 2019.

* cited by examiner

*Primary Examiner* — Mark S Kaucher

(57) ABSTRACT

Provided are a method for preparing a graft copolymer and a graft copolymer prepared thereby, the method comprising: preparing a reaction solution comprising a copolymer comprising a unit derived from a diene-based monomer and a unit derived from an alkene-based monomer, an aromatic vinyl-based monomer, a vinyl cyan-based monomer, and a reaction solvent; and adding the reaction solution to perform primary bulk polymerization at 100 to 110° C., wherein the copolymer comprises the unit derived from a diene-based monomer in an amount of 5 to 10 wt %, and the graft copolymer has an average rubber particle size of 2 to 5μm.

15 Claims, No Drawings

METHOD FOR PREPARING GRAFT COPOLYMER AND GRAFT COPOLYMER PREPARED THEREBY

TECHNICAL FIELD

Cross-Reference to Related Application

The present application is a National Phase of International Application No. PCT/KR2018/012847, filed on Oct. 26, 2018 which claims priority to and the benefit of Korean Patent Application No. 10-2017-0144958, filed on Nov. 1, 2017, the disclosure of which is incorporated herein by reference in its entirety.

Technical Field

The present invention relates to a method for preparing a graft copolymer and a graft copolymer prepared thereby, and more particularly, to a method for preparing a graft copolymer which realizes matte characteristics and excellent injection surface characteristics, and a graft copolymer prepared thereby.

BACKGROUND ART

An ABS graft copolymer prepared by graft polymerization of a conjugated diene-based polymer with an aromatic vinyl-based monomer and a vinyl cyan-based monomer has been applied in various fields due to its excellent strength, heat resistance, molding processability. However, this ABS graft copolymer has a drawback in that weather resistance is degraded because a hydrogen atom of a methyl group adjacent to a double bond remaining in the molecule, which results from the conjugated diene-based polymer, acts as an initiation point of oxidation by an action of light or oxygen to induce a main chain reaction. In particular, this drawback causes not only the surface of the copolymer to be whitened or cracked but also various properties of a thermoplastic resin molded article including the graft copolymer to be degraded. In order to prepare a copolymer with harmonious properties by imparting weather resistance while maintaining excellent properties of the graft copolymer, common methods such as addition of an UV stabilizer, coating, plating, and the like are employed. However, these methods do not essentially improve properties.

Therefore, a variety of graft copolymers, which uses a rubber having an unsaturated bond instead of the conjugated diene-based polymer resulting in degradation of the graft copolymer, have been developed, and an AES graft copolymer prepared using an ethylene-propylene copolymer is one of the developed graft copolymers. The AES graft copolymer is a graft copolymer that does not substantially include an unsaturated bond in a main chain and is obtained by graft polymerization of an ethylene-propylene copolymer or an ethylene-propylene-diene terpolymer, as a rubber component, with styrene, acrylonitrile, and the like. Compared with the ABS copolymer prepared using the conjugated diene-based rubber, the AES copolymer is known to be significantly resistant to ultraviolet rays, oxygen, and ozone and to be capable of realizing matte characteristics.

However, since the ethylene-propylene-based rubber and the ethylene-propylene-diene-based terpolymer have almost no reactive active moiety as compared with the butadiene-based rubber, it is not easy to perform graft polymerization of them with styrene and acrylonitrile, often resulting in formation of a simple mixture of a rubber polymer and a SAN copolymer. Therefore, when the AES graft copolymer thus obtained is subjected to injection molding, there are drawbacks of a stained surface, degraded impact strength, and the like, and, in severe cases, a phenomenon in which an injection surface is peeled off also occurs.

Accordingly, research on improvement of properties of the AES graft copolymer is continuing.

DISCLOSURE

Technical Problem

The present invention is directed to providing a graft copolymer with an excellent injection surface while realizing matte characteristics and a method for preparing the same.

Technical Solution

According to an embodiment of the present invention, there is provided a method for preparing a graft copolymer, which comprises preparing a reaction solution comprising a copolymer comprising a unit derived from a diene-based monomer and a unit derived from an alkene-based monomer, an aromatic vinyl-based monomer, a vinyl cyan-based monomer, and a reaction solvent; and adding the reaction solution to perform primary bulk polymerization at 100 to 110° C., wherein the copolymer comprises the unit derived from a diene-based monomer in an amount of 5 to 10 wt %, and the graft copolymer has an average rubber particle size of 2 to 5 μm.

In addition, according to another embodiment of the present invention, there is provided a graft copolymer prepared by the above-described method and having a glossiness of 22% or less as measured in accordance with ASTM 1003.

Advantageous Effects

A graft copolymer according to the present invention can realize matte characteristics and exhibit significantly excellent injection surface characteristics due to its excellent degree of grafting.

MODE FOR INVENTION

Hereinafter, the present invention will be described in more detail.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, the average rubber particle size of a graft copolymer may be defined as a particle size corresponding to the 50th percentile in the cumulative, volume-based particle size distribution curve.

In the present invention, the average rubber particle size of a graft copolymer may be measured after a predetermined amount of a graft copolymer is dissolved in a solvent. Specifically, the average rubber particle size of a graft copolymer may be measured using a Coulter counter (trade name: LS230, manufactured by Beckman Coulter Inc.) after 0.5 g of a graft copolymer is dissolved in 100 ml of methyl ethyl ketone.

In the present invention, the degree of grafting may be calculated by adding a predetermined amount of a graft copolymer to a solvent, followed by dissolution using a vibrator, centrifugation using a centrifuge, and drying to obtain an insoluble content, and then by using the insoluble content and the following equation.

Specifically, the degree of grafting may be calculated by adding a predetermined amount of a graft copolymer to acetone; dissolving the graft copolymer having been liberated through vibration using a vibrator (trade name: SI-600R, manufactured by Lab. Companion) for 24 hours; centrifuging the resultant solution using a centrifuge at 14,000 rpm for 1 hour; and drying using a vacuum dryer (trade name: DRV320DB, manufactured by Advantec) at 140° C. for 2 hours to obtain an insoluble content, and then by using the insoluble content and the following equation.

$$\text{Degree of grafting (\%)} = [(Y-(X\times R))/(X\times R)]\times 100$$

Y: Weight of insoluble content

X: Weight of graft copolymer added in the case where insoluble content is obtained R: Fraction of copolymer in graft copolymer added in the case where insoluble content is obtained In the present invention, the Mooney viscosity (ML (1+4), 100° C.) of a copolymer may be measured in accordance with ASTM D1646.

In the present invention, the weight average molecular weight of a copolymer may be measured as a relative value with respect to a standard specimen, polystyrene, through gel permeation chromatography (GPC) using tetrahydrofuran as an elution solvent.

In the present invention, glossiness may be measured in accordance with ASTM 1003 after a graft copolymer is injected to prepare a specimen with a thickness of 3 mm.

1. Method for Preparing Graft Copolymer

A method of preparing a graft copolymer according to an embodiment of the present invention includes 1) preparing a reaction solution including a copolymer including a unit derived from a diene-based monomer and a unit derived from an alkene-based monomer, an aromatic vinyl-based monomer, a vinyl cyan-based monomer, and a reaction solvent; and 2) adding the reaction solution to perform primary bulk polymerization at 100 to 110° C., wherein the copolymer includes the unit derived from a diene-based monomer in an amount of 5 to 10 wt %, and the graft copolymer has an average rubber particle size of 2 to 5 μm.

The method for preparing a graft copolymer according to an embodiment of the present invention may further include, after the primary bulk polymerization, 3) performing secondary bulk polymerization.

The method for preparing a graft copolymer according to an embodiment of the present invention may further include, after the secondary bulk polymerization, 4) recovering an unreacted monomer and the reaction solvent.

Hereinafter, the method for preparing a graft copolymer according to an embodiment of the present invention will be described in detail for each step.

1) Step of Preparing Reaction Solution

First, a reaction solution which includes a copolymer including a unit derived from a diene-based monomer and a unit derived from an alkene-based monomer, an aromatic vinyl-based monomer, a vinyl cyan-based monomer, and a reaction solvent is prepared.

The unit derived from a diene-based monomer may be a unit derived from one or more selected from the group consisting of dicyclopentadiene, ethylidene norbornene, and vinyl norbornene, and, in particular, a unit derived from ethylidene norbornene is preferred.

The unit derived from a diene-based monomer is included in an amount of 5 to 10 wt %, preferably, 5 to 8 wt % with respect to the total weight of the copolymer.

The unit derived from an alkene-based monomer is included in an amount of 90 to 95 wt %, preferably, 92 to 95 wt % with respect to the total weight of the copolymer.

When the contents of the unit derived from a diene-based monomer and the unit derived from an alkene-based monomer fall within the above ranges, graft polymerization with the aromatic vinyl-based monomer and the vinyl cyan-based monomer may be facilitated and economical. Also, a synergistic effect is realized due to a combination of the temperature of primary bulk polymerization to be described below and the content of the unit derived from a diene-based monomer, and thus an average rubber particle size of the graft copolymer may be appropriately realized, and a graft copolymer with excellent matte characteristics and an excellent injection surface may be prepared.

When the content of the unit derived from a diene-based monomer is less than the above range, graft polymerization may be not sufficiently performed, and thus rubber particles of the graft copolymer are non-uniformly formed. Therefore, an average rubber particle size thereof is rather increased, and the linkage between a copolymer-derived unit and a unit derived from an aromatic vinyl-based monomer or a unit derived from a vinyl cyan-based monomer becomes loose, resulting in a poor injection surface. When the content of the unit derived from a diene-based monomer is greater than the above range, manufacturing costs significantly increase.

The unit derived from an alkene-based monomer may be a unit derived from an alkene-based monomer having 2 to 4 carbon atoms.

The copolymer preferably includes at least two types of units derived from an alkene-based monomer, and more preferably includes a unit derived from ethylene and a unit derived from propylene.

The unit derived from ethylene may be included in an amount of 52 to 73 wt %, 55 to 70 wt %, 58 to 67 wt %, or 60 to 65 wt % with respect to the total weight of the copolymer, and is preferably included in an amount of 60 to 65 wt %.

When the content of the unit derived from ethylene falls within the above range, the properties of a graft copolymer which is a final product are harmoniously realized.

The unit derived from propylene may be included in an amount of 20 to 40 wt %, 22 to 37 wt %, 25 to 35 wt %, or 27 to 32 wt % with respect to the total weight of the copolymer, and is preferably included in an amount of 27 to 32 wt %.

When the content of the unit derived from propylene falls within the above range, the properties of a graft copolymer which is a final product are harmoniously realized.

The copolymer may have a Mooney viscosity (ML (1+4), 100° C.) of 30 to 80 or 50 to 80, and preferably has a Mooney viscosity of 50 to 80.

When the Mooney viscosity of the copolymer falls within the above range, a synergistic effect is realized due to a combination of the temperature of primary bulk polymerization to be described below and the content of the unit derived from a diene-based monomer in the copolymer, and thus an appropriate average particle size of a copolymer-derived unit may be realized, thereby a graft copolymer with excellent matte characteristics and an excellent injection surface may be prepared.

The copolymer may have a weight average molecular weight of 110,000 to 250,000 g/mol, 130,000 to 230,000 g/mol, 150,000 to 210,000 g/mol, or 170,000 to 190,000 g/mol, and preferably has a weight average molecular weight of 170,000 to 190,000 g/mol.

When the weight average molecular weight of the copolymer falls within the above range, mechanical properties such as impact strength and the like may be excellent, and appropriate viscosity may be realized, and thus the process may be easily operated.

The copolymer may be included in an amount of 3 to 15 wt %, 5 to 12 wt %, or 7 to 10 wt % with respect to the total weight of the reaction solution, and is preferably included in an amount of 7 to 10 wt %.

When the content of the copolymer falls within the above range, a graft copolymer which may realize matte characteristics while realizing excellent weather resistance and has an excellent injection surface may be prepared.

The aromatic vinyl-based monomer may be one or more selected from the group consisting of styrene, α-methylstyrene, α-ethylstyrene, p-methylstyrene, and 2,4-dimethylstyrene, and, in particular, styrene is preferred.

The aromatic vinyl-based monomer may be included in an amount of 40 to 65 wt %, 45 to 60 wt %, or 50 to 55 wt % with respect to the total weight of the reaction solution, and is preferably included in an amount of 50 to 55 wt %.

When the content of the aromatic vinyl-based monomer falls within the above range, a graft copolymer which may realize matte characteristics while realizing excellent weather resistance and has an excellent injection surface may be prepared.

The vinyl cyan-based monomer may be one or more selected from the group consisting of acrylonitrile, methacrylonitrile, ethacrylonitrile, phenylacrylonitrile, and α-chloroacrylonitrile, and, in particular, acrylonitrile is preferred.

The vinyl cyan-based monomer may be included in an amount of 5 to 25 wt %, 8 to 20 wt %, or 10 to 15 wt % with respect to the total weight of the reaction solution, and is preferably included in an amount of 10 to 15 wt %.

When the content of the vinyl cyan-based monomer falls within the above range, a graft copolymer which may realize matte characteristics while realizing excellent weather resistance and has an excellent injection surface may be prepared.

The reaction solvent may be one or more selected from the group consisting of toluene, ethylbenzene, xylene, and methyl ethyl ketone, and, in particular, ethylbenzene is preferred.

The reaction solvent may be included as the remainder such that the total content of components of the reaction solution is 100 wt %. Due to the reaction solvent, the reaction solution may have an appropriate viscosity, bulk polymerization to be described below may be facilitated, and the amount of an unreacted monomer and the like contained in a final product may be reduced.

2) Step of Performing Primary Bulk Polymerization

Subsequently, primary bulk polymerization of the reaction solution is performed at 100 to 110° C.

The primary bulk polymerization is a step of phase inversion of the copolymer, the aromatic vinyl-based monomer, and the vinyl cyan-based monomer, and a phase inversion rate is improved when the primary bulk polymerization is performed at the above-described temperature. In addition, a synergistic effect is realized due to a combination of the temperature of primary bulk polymerization and the content of the unit derived from a diene-based monomer in the copolymer, and thus graft polymerization with the aromatic vinyl-based monomer and the vinyl cyan-based monomer may be facilitated. Additionally, a graft copolymer with an appropriate average rubber particle size and an appropriate degree of grafting may be prepared, and a graft copolymer excellent in not only matte characteristics but also injection surface characteristics may also be prepared.

When the temperature of primary bulk polymerization is less than the above range, a phase inversion rate is decreased. When the temperature of primary bulk polymerization is greater than the above range, a reaction rate of graft polymerization is lowered, and thus an average rubber particle size is excessively increased, and a poor injection surface is exhibited.

The primary bulk polymerization may be performed for 0.5 to 4 hours, 1.0 to 3.5 hours, 1.5 to 3.0 hours, or 1.5 to 2.5 hours, and is preferably performed for 1.5 to 2.5 hours.

When the duration of primary bulk polymerization falls within the above range, the phase inversion rate may further increase.

The primary bulk polymerization may be performed while stirring the reaction solution at 50 to 90 rpm, 55 to 85 rpm, 60 to 80 rpm, or 65 to 75 rpm, and is preferably performed while stirring at 65 to 75 rpm.

When the stirring speed falls within the above range, matte characteristics may be further improved.

In the primary bulk polymerization, an initiator and a molecular weight controlling agent may be further added.

The initiator may be a radical polymerization initiator with a 1 hour half-life temperature of 90 to 110° C. The initiator may be one or more selected from the group consisting of stearoyl peroxide, benzoyl peroxide, t-butylperoxy-2-ethylhexanoate, t-butylperoxy-isobutyrate, and 1,1-di(t-butylperoxy)-3,5,5-trimethylcyclohexane, and, in particular, t-butylperoxy-2-ethylhexanoate is preferred.

The initiator may be added in an amount of 0.01 to 0.2 part by weight, 0.02 to 0.1 part by weight, 0.02 to 0.08 part by weight, or 0.02 to 0.06 part by weight with respect to 100 parts by weight of the reaction solution, and is preferably added in an amount of 0.02 to 0.06 part by weight. When the addition amount of the initiator falls within the above range, graft polymerization may be easily performed, and the polymer-derived unit may be easily formed.

The molecular weight controlling agent may be one or more selected from the group consisting of t-dodecyl mercaptan and n-octyl mercaptan, and, in particular, t-dodecyl mercaptan is preferred.

The molecular weight controlling agent may be added in an amount of 0.02 to 0.9 part by weight, 0.02 to 0.8 part by weight, or 0.03 to 0.7 part by weight with respect to 100 parts by weight of the reaction solution, and is preferably added in an amount of 0.03 to 0.7 part by weight.

When the addition amount of the molecular weight controlling agent falls within the above range, not only graft polymerization may be easily performed, but also the copolymer-derived unit may have an appropriate average particle size. Also, a graft copolymer with more excellent impact strength may be prepared.

The primary bulk polymerization may be continuous bulk polymerization that is performed by continuously adding the reaction solution, the initiator, and the molecular weight controlling agent at a predetermined rate.

3) Step of Performing Secondary Bulk Polymerization

Subsequently, secondary bulk polymerization of the reaction solution having been subjected to the primary bulk polymerization may be further performed at 130 to 150° C.

The secondary bulk polymerization is performed to increase a polymerization conversion ratio, and a polymerization conversion ratio may be further improved when the secondary bulk polymerization is performed at the above-described temperature.

The secondary bulk polymerization may be performed in a reactor different from a reactor used for the primary bulk polymerization. The reactors used for the primary bulk polymerization and the secondary bulk polymerization may be continuous reactors that are connected in series. The reactor used for the secondary bulk polymerization may be a continuous reactor in which three or more reactors are connected in series.

The secondary bulk polymerization may be performed while gradually raising the temperature within a range of 130 to 150° C. In order to change the polymerization temperature, bulk polymerization may be performed after the reaction solution is transferred to another reactor.

In addition, the secondary bulk polymerization may be performed by continuously adding the reaction solution.

The secondary bulk polymerization may be performed while stirring the reaction solution at 30 to 70 rpm, 35 to 65 rpm, 40 to 60 rpm, or 45 to 55 rpm, and is preferably performed while stirring at 45 to 55 rpm.

When the stirring speed falls within the above range, matte characteristics may be further improved.

In the secondary bulk polymerization, a molecular weight controlling agent may be further added. The type of the molecular weight controlling agent is the same as described above.

The molecular weight controlling agent may be added in an amount of 0.02 to 0.9 part by weight, 0.02 to 0.8 part by weight, or 0.03 to 0.7 part by weight with respect to 100 parts by weight of the reaction solution, and is preferably added in an amount of 0.03 to 0.7 part by weight.

When the addition amount of the molecular weight controlling agent falls within the above range, not only graft polymerization may be easily performed, but also the copolymer-derived unit may have an appropriate average particle size. Also, a graft copolymer with more excellent impact strength may be prepared.

4) Step of Recovering Unreacted Monomer and Reaction Solvent

Subsequently, a step of recovering an unreacted monomer and a reaction solvent may be further performed.

The step of recovering an unreacted monomer and a reaction solvent may be performed in a devolatilizer. The devolatilizer equipped with a heat exchanger may maintain the degree of vacuum at a temperature of 220 to 250° C. and a pressure of less than 25 torr, a temperature of 225 to 245° C. and a pressure of less than 20 torr, or a temperature of 230 to 240° C. and a pressure of less than 16 torr, and preferably maintains the degree of vacuum at a temperature of 230 to 240° C. and a pressure of less than 16 torr.

When the recovery step is performed under the above conditions, an unreacted monomer and a solvent contained in the polymerization product may be easily recovered.

A graft copolymer prepared by the method for preparing a graft copolymer according to an embodiment of the present invention may have an average rubber particle size of 2 to 5 μm, preferably 2.5 to 4.5 μm, and more preferably 3 to 4.2 μm.

When the average rubber particle size of the graft copolymer falls within the above range, a graft polymer with an excellent injection surface while realizing matte characteristics may be prepared. When the average rubber particle size of the graft copolymer is less than the above range, matte characteristics may not be realized, and when the average rubber particle size of the graft copolymer is greater than the above range, the graft copolymer with a poor injection surface is prepared.

A graft copolymer prepared by the method for preparing a graft copolymer according to an embodiment of the present invention may have the degree of grafting of 35 to 60% or 40 to 55%, and preferably has the degree of grafting of 40 to 55%.

When the degree of grafting for the graft copolymer falls within the above range, a graft polymer with an excellent injection surface while realizing matte characteristics may be prepared.

2. Graft Copolymer

A graft copolymer prepared by the method for preparing a graft copolymer according to an embodiment of the present invention may have a glossiness of 22% or less, as measured in accordance with ASTM 1003.

The graft copolymer may have a glossiness of 16% or less or 12% or less, as measured in accordance with ASTM 1003, and preferably has a glossiness of 12% or less. When the glossiness of the graft copolymer falls within the above range, matte characteristics may be realized. When the glossiness of the graft copolymer is greater than 22%, the graft copolymer may not realize matte characteristics.

In addition, the graft copolymer may have an excellent injection surface and may also exhibit excellent impact strength.

Hereinafter, the present invention will be described in detail with reference to embodiments so that those skilled in the art can easily carry out the present invention. However, the present invention may be implemented in several different forms, and therefore, is not limited to embodiments described herein.

Examples and Comparative Examples 53.6 parts by weight of styrene, 13.4 parts by weight of acrylonitrile, and 8 parts by weight of an ethylene-propylene-diene terpolymer as listed in Table 1 below were completely dissolved in 25 parts by weight of ethylbenzene as a reaction solvent, and t-butylperoxy-2-ethylhexanoate as an initiator and t-dodecyl mercaptan as a molecular weight controlling agent were added in amounts as listed in Table 1 below to prepare a reaction solution.

The polymerization solution was added to a first reactor whose internal temperature was set as listed in Table 2 below at a predetermined rate for 2 hours, and primary polymerization was performed while stirring at a speed as listed in Table 2 below. The product of primary polymerization was added to a second reactor whose internal temperature was set as listed in Table 2 below at a predetermined rate for 1.5 hours, and secondary polymerization was performed while stirring at a speed as listed in Table 2 below. 0.03 part by weight of t-dodecyl mercaptan as a molecular weight controlling agent was batch-added to the second reactor. The product of secondary polymerization was added to a third reactor whose internal temperature was set as listed in Table 2 below at a predetermined rate for 1.5 hours, and tertiary polymerization was performed while stirring at a speed as listed in Table 2 below. The product of tertiary polymerization was added to a fourth reactor whose internal temperature was set as listed in Table 2 below at a predetermined rate for 1.5 hours, and quaternary polymerization was performed while stirring at a speed as listed in Table 2 below. After the polymerization was terminated, an unreacted monomer and a reaction solvent were recovered and removed in a devolatilizer at 230° C. and 15 torr to prepare a pellet-type graft copolymer.

TABLE 1

| Classification | Ethylene-propylene-diene terpolymer | | | | | |
|---|---|---|---|---|---|---|
| | ML (1 + 4, 100° C.) | Components (wt %) | | | Initiator (part by weight) | Molecular weight controlling agent (part by weight) |
| | | a unit derived from ethylene | a unit derived from propylene | a unit derived from ethylidene norbornene | | |
| Example 1 | 50 | 62 | 30 | 8 | 0.03 | 0.03 |
| Example 2 | 35 | 63 | 32 | 5 | 0.03 | 0.03 |
| Example 3 | 80 | 64 | 28 | 8 | 0.03 | 0.03 |
| Example 4 | 50 | 62 | 30 | 8 | 0.03 | 0.03 |
| Example 5 | 50 | 62 | 30 | 8 | 0.06 | 0.03 |
| Example 6 | 50 | 62 | 30 | 8 | 0.03 | 0.70 |
| Example 7 | 50 | 62 | 30 | 8 | 0.03 | 0.03 |
| Comparative Example 1 | 50 | 66 | 32 | 2 | 0.03 | 0.03 |
| Comparative Example 2 | 20 | 62 | 30 | 8 | 0.06 | 0.03 |
| Comparative Example 3 | 50 | 62 | 30 | 8 | 0.03 | 0.03 |
| Comparative Example 4 | 50 | 62 | 30 | 8 | 0.01 | 0.03 |
| Comparative Example 5 | 50 | 62 | 30 | 8 | 0.03 | 1.0 |
| Comparative Example 6 | 50 | 62 | 30 | 8 | 0.03 | 0.03 |
| Comparative Example 7 | 50 | 62 | 30 | 8 | 0.03 | 0.03 |
| Comparative Example 8 | 50 | 62 | 30 | 8 | 0.03 | 0.03 |

TABLE 2

| Classification | First reactor | | Second reactor | | Third reactor | | Fourth reactor | |
|---|---|---|---|---|---|---|---|---|
| | Internal temperature (° C.) | Stirring speed (rpm) | Internal temperature (° C.) | Stirring speed (rpm) | Internal temperature (° C.) | Stirring speed (rpm) | Internal temperature (° C.) | Stirring speed (rpm) |
| Example 1 | 105 | 70 | 130 | 50 | 140 | 50 | 150 | 50 |
| Example 2 | 105 | 70 | 130 | 50 | 140 | 50 | 150 | 50 |
| Example 3 | 105 | 70 | 130 | 50 | 140 | 50 | 150 | 50 |
| Example 4 | 110 | 70 | 130 | 50 | 140 | 50 | 150 | 50 |
| Example 5 | 105 | 70 | 130 | 50 | 140 | 50 | 150 | 50 |
| Example 6 | 105 | 70 | 130 | 50 | 140 | 50 | 150 | 50 |
| Example 7 | 100 | 70 | 130 | 50 | 140 | 50 | 150 | 50 |
| Comparative Example 1 | 105 | 70 | 130 | 50 | 140 | 50 | 150 | 50 |
| Comparative Example 2 | 105 | 70 | 130 | 50 | 140 | 50 | 150 | 50 |
| Comparative Example 3 | 120 | 70 | 130 | 50 | 140 | 50 | 150 | 50 |
| Comparative Example 4 | 105 | 70 | 130 | 50 | 140 | 50 | 150 | 50 |
| Comparative Example 5 | 105 | 70 | 130 | 50 | 140 | 50 | 150 | 50 |
| Comparative Example 6 | 105 | 150 | 130 | 50 | 140 | 50 | 150 | 50 |
| Comparative Example 7 | 95 | 70 | 130 | 50 | 140 | 50 | 150 | 50 |
| Comparative Example 8 | 115 | 70 | 130 | 50 | 140 | 50 | 150 | 50 |

Experimental Example

Properties of the graft copolymers according to Examples and Comparative Examples were evaluated by methods as described below, and results thereof are shown in Table 3 below.

(1) Average rubber particle size (μm): measured using a Coulter counter (trade name: LS230, manufactured by Beckman Coulter Inc.) after 0.5 g of a graft copolymer was dissolved in 100 ml of methyl ethyl ketone.

(2) Glossiness (%): measured in accordance with ASTM 1003 after a graft copolymer was injected to prepare a specimen with a thickness of 3 mm.

(3) Degree of grafting: obtained an insoluble content by adding a predetermined amount of a graft copolymer to acetone; dissolving the graft copolymer having been liberated through vibration using a vibrator for 24 hours; centrifuging the resultant solution including the graft copolymer dissolved therein using a centrifuge at 14,000 rpm for 1 hour; and drying the centrifuged substance using a vacuum dryer at 140° C. for 2 hours.

Degree of grafting(%)=[($Y-(X \times R))/(X \times R)$]×100

Y: Weight of insoluble content
X: Weight of graft copolymer added in the case where insoluble content is obtained
R: Fraction of copolymer in graft copolymer added in the case where insoluble content is obtained (4) Impact strength (kg·cm/cm): measured in accordance with ASTM D256-10 after a graft copolymer was injected to ¼ inch.

(5) Injection surface: determined by observing the surface of an injection molded article through visual observation after a graft copolymer was injected 5 times. (◯: Good, Δ: Fair, X: Poor)

TABLE 3

| Classification | Average rubber particle size (μm) | Glossiness (%) | Degree of grafting (%) | Impact strength (kg·cm/cm) | Injection surface |
|---|---|---|---|---|---|
| Example 1 | 2.9 | 16 | 51 | 28 | ◯ |
| Example 2 | 2.3 | 22 | 39 | 24 | ◯ |
| Example 3 | 3.8 | 11 | 51 | 21 | ◯ |
| Example 4 | 3.2 | 12 | 43 | 25 | ◯ |
| Example 5 | 2.1 | 22 | 58 | 31 | ◯ |
| Example 6 | 4.2 | 10 | 49 | 20 | ◯ |
| Example 7 | 3.6 | 13 | 55 | 22 | ◯ |
| Comparative Example 1 | 6.2 | 10 | 26 | 13 | X |
| Comparative Example 2 | 1.3 | 57 | 68 | 22 | ◯ |
| Comparative Example 3 | 5.4 | 12 | 25 | 16 | X |
| Comparative Example 4 | 6.8 | 9 | 29 | 12 | X |
| Comparative Example 5 | 6.3 | 11 | 52 | 13 | Δ |
| Comparative Example 6 | 1.5 | 62 | 50 | 23 | ◯ |
| Comparative Example 7 | 4.3 | 13 | 29 | 12 | Δ |
| Comparative Example 8 | 6.1 | 10 | 22 | 14 | X |

Referring to Table 3, it can be confirmed that the graft copolymers of Examples 1 to 7 had an average rubber particle size of 2.1 to 4.2 μm and a glossiness of 22% or less, and thus realized matte characteristics. In addition, it can be confirmed that the graft copolymers had the degree of grafting of 39 to 58%, and thus exhibited an excellent injection surface.

Meanwhile, referring to Example 1, Example 4, and Example 7, it can be confirmed that, although the same ethylene-propylene-diene terpolymers were added, as the temperature inside the first reactor was lower, matte characteristics and the degree of grafting were better.

Referring to Example 1 and Comparative Example 1, it can be confirmed that, although an ethylene-propylene-diene terpolymer was used to prepare a graft copolymer, as the amount of ethylidene norbornene contained in the ethylene-propylene-diene terpolymer was smaller, an average rubber particle size was increased, and the degree of grafting was degraded. Comparative Example 1 had an average rubber particle size of 6.2 μm and thus realized matte characteristics, but it exhibited a poor injection surface due to its low degree of grafting.

In addition, referring to Example 1, Example 3, Example 5, and Comparative Example 2, it can be confirmed that, although an ethylene-propylene-diene terpolymer was used to prepare a graft copolymer, as the Mooney viscosity of the ethylene-propylene-diene terpolymer was higher, an average rubber particle size was increased. Specifically, referring to Example 1 and Example 3, it can be confirmed that Example 3, in which an ethylene-propylene-diene terpolymer with a high Mooney viscosity was used, had a large average rubber particle size and a low glossiness, and thus exhibited more excellent matte characteristics. In addition, referring to Example 5 and Comparative Example 2, it can be confirmed that Example 5, in which an ethylene-propylene-diene terpolymer with a high Mooney viscosity was used, had a large average rubber particle size and a significantly low glossiness, and thus exhibited more excellent matte characteristics.

In addition, referring to Example 1, Example 5, and Comparative Example 4, it can be confirmed that, as the amount of an initiator was higher, an average rubber particle size was decreased, and glossiness was increased. Also, it can be confirmed that, in the case of Comparative Example 4 in which a small amount of an initiator was added, a graft copolymer with an average rubber particle size of 6.8 μm was prepared, and since the average rubber particle size was excessively large, an inferior injection surface was exhibited.

In addition, referring to Example 1, Example 6, and Comparative Example 5, it can be confirmed that as the amount of a molecular weight controlling agent increased, an average rubber particle size was increased, and glossiness was decreased. Also, it can be confirmed that, in the case of Comparative Example 5 in which an excessive amount of a molecular weight controlling agent was added, a graft copolymer with an average rubber particle size of 6.3 μm was prepared, and since the average rubber particle size was excessively large, an inferior injection surface was exhibited.

Additionally, referring to Example 1 and Comparative Example 6, it can be confirmed that Comparative Example 6, in which the stirring speed in the first reactor was almost twice as high as in Example 1 while all the other conditions were the same, exhibited a significantly high glossiness, and thus did not realize matte characteristics.

It can be confirmed that Comparative Example 7, in which the temperature inside the first reactor was relatively low, exhibited a poor injection surface and poor impact strength, and Comparative Example 8, in which the temperature inside the first reactor was relatively high, exhibited an increase in average rubber particle size and a poor injection surface and poor impact strength.

The invention claimed is:

1. A method for preparing a graft copolymer, comprising:
preparing a reaction solution comprising a copolymer comprising a unit derived from a diene-based monomer and a unit derived from an alkene-based monomer, an aromatic vinyl-based monomer, a vinyl cyan-based monomer, and a reaction solvent; and
adding the reaction solution to perform primary polymerization at 100 to 110° C.,
wherein the copolymer comprises the unit derived from the diene-based monomer in an amount of 5 to 10 wt %, and
the graft copolymer has an average rubber particle size of 2 to 5 μm.

2. The method of claim 1, wherein the graft copolymer has an average rubber particle size of 2.5 to 4.5 μm.

3. The method of claim 1, wherein the graft copolymer has a degree of grafting of 35 to 60%.

4. The method of claim 1, wherein the graft copolymer has a degree of grafting of 40 to 55%.

5. The method of claim 1, wherein the primary polymerization is performed by primarily polymerizing the reaction solution at 100 to 110° C. while stirring at 50 to 90 rpm.

6. The method of claim 1, wherein the unit derived from the diene-based monomer comprises a unit derived from ethylidene norbornene.

7. The method of claim 1, wherein the unit derived from the alkene-based monomer comprises a unit derived from ethylene and a unit derived from propylene.

8. The method of claim 1, wherein the copolymer has a Mooney viscosity (ML (1+4), 100° C.) of 30 to 80.

9. The method of claim 1, wherein the copolymer has a weight average molecular weight of 110,000 to 250,000 g/mol.

10. The method of claim 1, wherein the reaction solution includes, with respect to a total weight thereof,
3 to 15 wt % of the copolymer;
40 to 65 wt % of the aromatic vinyl-based monomer;
5 to 25 wt % of the vinyl cyan-based monomer; and
the reaction solvent as the remainder.

11. The method of claim 1, wherein, in the primary polymerization, an initiator and a molecular weight controlling agent are further added.

12. The method of claim 11, wherein, with respect to 100 parts by weight of the reaction solution,
0.02 to 0.2 part by weight of the initiator; and
0.02 to 0.9 part by weight of the molecular weight controlling agent are further added.

13. The method of claim 1, further comprising, after the primary polymerization, performing secondary polymerization of the reaction solution having been subjected to the primary polymerization at 130 to 150° C.

14. The method of claim 13, wherein the secondary polymerization is performed by secondarily polymerizing the reaction solution having been subjected to the primary polymerization, at 130 to 150° C. while stirring at 30 to 70 rpm.

15. A graft copolymer prepared by the method of claim 1 and having a glossiness of 22% or less as measured in accordance with ASTM 1003.

* * * * *